W. CALDWELL.
DETACHABLE HEAD FOR CONNECTING RODS OR BOLTS.
APPLICATION FILED SEPT. 5, 1914.
1,133,428.    Patented Mar. 30, 1915.
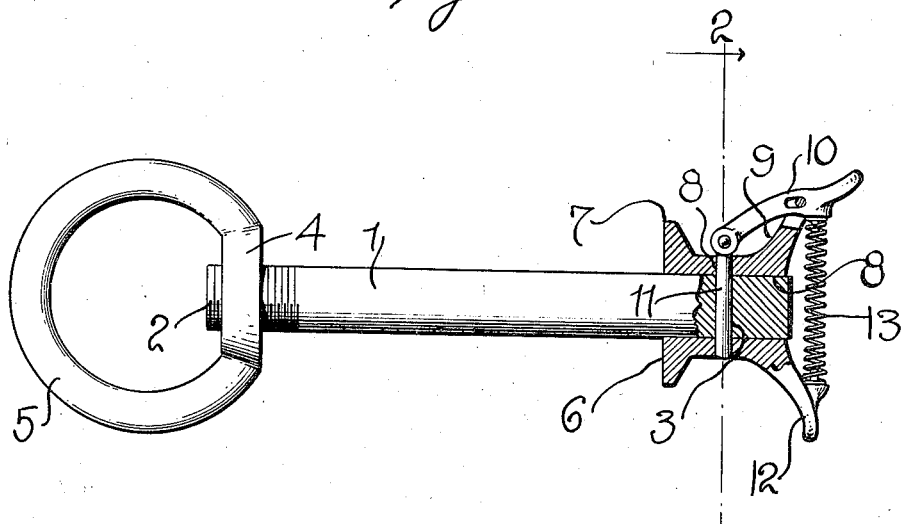
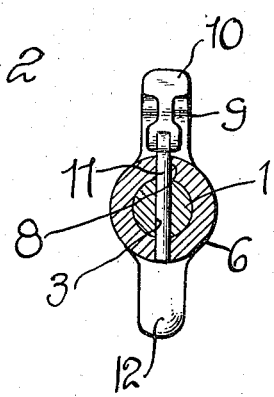
Witnesses
Robert M. Sutphen
A. I. Hind.
Inventor
WARD CALDWELL
By Watson E. Coleman
Attorney

UNITED STATES PATENT OFFICE.

WARD CALDWELL, OF DEKALB COUNTY, NEAR LELAND, ILLINOIS.

DETACHABLE HEAD FOR CONNECTING RODS OR BOLTS.

1,133,428.  Specification of Letters Patent.  Patented Mar. 30, 1915.

Application filed September 5, 1914. Serial No. 860,423.

*To all whom it may concern:*

Be it known that I, WARD CALDWELL, a citizen of the United States, residing in Dekalb county, near Leland, in the county of La Salle, State of Illinois, have invented certain new and useful Improvements in Detachable Heads for Connecting Rods or Bolts, of which the following is a specification, reference being had to the accompanying drawings.

This invention relates to improvements in connecting rods or bolts, and relates particularly to rods or bolts for connecting drive shafts of a wind mill to the pump rod thereof, and for other similar connections.

An object of this invention is the provision of a connecting rod or bolt which is provided with a detachable head, whereby the device may be quickly placed in a position to connect two objects together, or may be quickly removed from the connected objects.

A further object of this invention is the provision of a bolt which is provided with a hollow detachable head, the head being moved longitudinally of the bolt when the same is connected to or disconnected from the same, the head being automatically locked upon the bolt when the head is moved to its proper position thereon.

With these and other objects in view, my invention consists in the novel construction, combination, and arrangement of parts, to be hereinafter more fully described, claimed, and illustrated in the accompanying drawing, in which—

Figure 1 is a sectional view partly in section of my device; and Fig. 2 is a sectional view on the line 2—2 of Fig. 1.

Referring more particularly to the drawing, the numeral 1 designates a connecting rod or bolt, which member I shall hereinafter designate as a bolt, for convenience in describing the device. The bolt is threaded as at 2 at one end thereof, and is provided with a transversely extending opening 3 therethrough adjacent its opposite end. Adapted for threaded engagement upon the threaded end 2 of the bolt is a nut 4 which is preferably provided with a laterally extending loop or ring 5, whereby the nut may be easily turned upon the bolt. Adapted for slidable engagement upon the end of the bolt having the opening 3 therein is a tubular head 6 which is provided with an annular flange 7 at its inner end to provide a shoulder for engagement against one of the objects to be connected together on the bolt, the head having a transverse opening 8 extending therethrough which is adapted to register with the opening 3 in the bolt. Extending radially from the outer end of the head is an arm 9 upon which a lever 10 is pivoted intermediate of its ends, the inner end of the lever having one end of a plunger 11 pivotally connected thereto, which plunger is adapted for engagement through the registering openings 3 and 8 of the bolt and head respectively. Extending longitudinally from the outer end of the head at a point diametrically opposite the arm 9 is a finger hook 12, and disposed between the hook 12 and the outer end of the lever 10 is an expansion spring 13, the tension of which normally forces the plunger 11 into the opening 8 in the head.

In the practical use of my improved device, when it is desired to connect two members together such as the drive shaft and the pump rod of a wind mill, the head 6 is disengaged from the bolt and the nut 4 is turned slightly upon the same, so that the bolt may be manipulated by engaging a finger through the ring 5 and passing the bolt through the drive shaft and the pump rod to pivotally connect the same together. To secure the bolt in its proper position, the thumb is placed against the outer end of the lever 10 and the finger is engaged under the hook 12 whereby upon inward pressure of the thumb, the outer end of the lever 10 is moved inwardly against the tension of the spring 13 to move the plunger 11 from its position across the bore of the head 6 whereby the head may be readily moved upon the bolt over the end thereof. The tension of the spring 13 forces the free end of the plunger against the periphery of the bolt, and when the head is moved inwardly sufficiently to register the opening 8 in the head with the opening 3 in the bolt, the tension of the spring forces the plunger into the registering openings to lock the head on the bolt. When the head is in its locked position on the bolt, the nut is then turned to tighten the same, whereby all of the parts are securely fastened together. When it is desired to remove the connecting bolt, it is merely necessary to force the outer end of the lever inwardly to disengage the plunger 11 from the registering openings, whereupon the head may be moved off the bolt and the bolt withdrawn from the objects through which it is extended.

Having thus fully described my invention, what I desire to claim and secure by Letters Patent is:—

1. A device of the character described comprising a body having a transverse opening therein adjacent one end, a hollow head slidably mounted on the body and through which the body passes and having an opening therein adapted to register with the opening of the body, a lever pivotally mounted upon the body intermediate of the ends of the lever, a plunger pivotally connected at one end to said lever and adapted for engagement through the registering openings, and a spring engaging the lever at the end opposite the plunger and normally urging said plunger into the hollow head, the end of the lever engaged by said spring being prolonged beyond the head and providing a finger piece.

2. A device of the character described comprising a cylindrical body having a transverse opening therein adjacent one end, a hollow head slidably mounted on the body, said head having an opening therein adapted to register with the opening in the body, an arm extending radially from said head at one end thereof, a lever pivotally connected intermediate of its ends to said arm, a plunger pivotally connected to one end of said lever and adapted for engagement through the registering openings, a finger hook extending longitudinally from the body at a point diametrically opposite said arm, and an expansion spring disposed between said finger hook and the other end of the lever to normally force said plunger inwardly of the head.

In testimony whereof I hereunto affix my signature in the presence of two witnesses.

WARD CALDWELL.

Witnesses:
  ALVIN WARREN,
  C. H. WHITE.